(12) United States Patent
Hunt et al.

(10) Patent No.: US 10,006,553 B2
(45) Date of Patent: Jun. 26, 2018

(54) VENT VALVE AND METHOD OF USE

(71) Applicant: Weatherford U.K. Limited, Leicestershire (GB)

(72) Inventors: Robert Andrew Hunt, Norfolk (GB); Kevin Read, Suffolk (GB)

(73) Assignee: Weatherford U.K. Limited, Loughborough, Leicestershire (GB)

( * ) Notice: Subject to any disclaimer, the term of this patent is extended or adjusted under 35 U.S.C. 154(b) by 0 days. days.

(21) Appl. No.: 14/669,442

(22) Filed: Mar. 26, 2015

(65) Prior Publication Data

US 2015/0285392 A1 Oct. 8, 2015

(30) Foreign Application Priority Data

Apr. 7, 2014 (GB) .................... 1406245.9

(51) Int. Cl.
*F16K 17/06* (2006.01)
*F16K 31/122* (2006.01)
(Continued)

(52) U.S. Cl.
CPC ............ *F16K 17/065* (2013.01); *E21B 34/00* (2013.01); *F16K 1/38* (2013.01); *F16K 31/1221* (2013.01);
(Continued)

(58) Field of Classification Search
CPC ......... Y10T 137/7835; Y10T 137/7836; Y10T 137/7764; Y10T 137/777; E21B 21/08; E21B 34/00; F16K 31/1221; F16K 31/1223; F16K 31/1226; F16K 1/38; F16K 17/065; F16K 17/10
(Continued)

(56) References Cited

U.S. PATENT DOCUMENTS 2,351,841 A * 6/1944 Seem ..................... A21C 5/08
137/509
2,474,772 A * 6/1949 Ashton ................ F15B 13/024
137/102
(Continued)

FOREIGN PATENT DOCUMENTS

WO 2013059251 A 4/2013

OTHER PUBLICATIONS

Search Report received in corresponding application No. GB1406245.9, dated Oct. 16, 2014, 3 pages.

*Primary Examiner* — William McCalister
(74) *Attorney, Agent, or Firm* — Blank Rome, LLP

(57) ABSTRACT

A vent valve comprises a valve housing defining a vent port and a valve member mounted within the housing so as to define a fluid system chamber and an activation chamber with the housing. The valve member is biased towards a closed position, in which fluid communication between the fluid system chamber and the vent port is prevented, by fluid pressure within the fluid system chamber acting on the valve member. The valve member is biased towards an open position, in which there is fluid communication between the fluid system chamber and the vent port, by fluid pressure within the activation chamber acting on the valve member. The vent valve further comprises a pressure limiting arrangement associated with the activation chamber to limit pressure therein to a predetermined pressure value.

22 Claims, 3 Drawing Sheets

(51) Int. Cl.
*F16K 1/38* (2006.01)
*E21B 34/00* (2006.01)
*F16K 17/10* (2006.01)

(52) U.S. Cl.
CPC ......... *F16K 17/10* (2013.01); *Y10T 137/0318* (2015.04); *Y10T 137/777* (2015.04); *Y10T 137/7762* (2015.04); *Y10T 137/7764* (2015.04)

(58) Field of Classification Search
USPC .................................. 137/509, 510; 251/63
See application file for complete search history.

(56) References Cited

U.S. PATENT DOCUMENTS

| | | | | | |
|---|---|---|---|---|---|
| 2,508,399 | A | * | 5/1950 | Kendrick | B60T 11/32 137/498 |
| 2,509,880 | A | * | 5/1950 | Pelton | F04B 39/16 137/204 |
| 2,959,188 | A | * | 11/1960 | Kepner | F16K 15/026 137/539 |
| 3,100,503 | A | * | 8/1963 | Tennis | F15B 21/04 137/491 |
| 3,590,839 | A | * | 7/1971 | Moore | F16K 17/16 123/511 |
| 3,786,828 | A | * | 1/1974 | Krechel | F04B 49/022 137/115.19 |
| 3,943,968 | A | * | 3/1976 | Treichler | B64C 13/38 137/493 |
| 3,981,479 | A | * | 9/1976 | Foster | F15B 13/01 137/522 |
| 4,040,600 | A | * | 8/1977 | Coppola | F16K 31/1221 251/333 |
| 4,089,344 | A | * | 5/1978 | Flaschar | G05D 16/10 137/491 |
| 4,172,582 | A | * | 10/1979 | Bobnar | F15B 11/003 251/282 |
| 4,192,338 | A | * | 3/1980 | Gerulis | F15B 13/01 137/106 |
| 4,192,346 | A | * | 3/1980 | Iizumi | F15B 13/01 137/509 |
| 4,199,004 | A | * | 4/1980 | Wada | F16K 17/196 137/454.5 |
| 4,838,306 | A | * | 6/1989 | Horn | F15B 13/01 137/522 |
| 4,889,472 | A | * | 12/1989 | Decker | F04B 9/115 417/46 |
| 5,081,904 | A | * | 1/1992 | Horn | F15B 13/01 91/420 |
| 5,144,976 | A | * | 9/1992 | Crumb | B60T 8/265 137/509 |
| 5,205,315 | A | * | 4/1993 | Margerum | B60C 23/16 137/203 |
| 5,233,910 | A | * | 8/1993 | Laichinger | B60G 17/0565 137/625.49 |
| 5,540,258 | A | * | 7/1996 | Cho | F15B 13/015 137/596.2 |
| 5,758,683 | A | * | 6/1998 | Cook | B65G 25/065 137/115.23 |
| 5,878,949 | A | * | 3/1999 | Matsui | G05D 23/025 137/509 |
| 5,878,992 | A | * | 3/1999 | Edwards | B67C 3/26 251/122 |
| 5,960,814 | A | * | 10/1999 | Kot | F15B 13/01 137/106 |
| 5,996,466 | A | * | 12/1999 | Heusser | F15B 11/003 137/110 |
| 6,006,780 | A | * | 12/1999 | Tseng | G05D 16/166 137/488 |
| 6,131,610 | A | * | 10/2000 | Morisako | F15B 13/01 137/601.19 |
| 6,370,875 | B1 | * | 4/2002 | Decker | F04B 17/00 417/47 |
| 6,390,199 | B1 | * | 5/2002 | Heijnen | E21B 34/08 137/460 |
| 6,581,630 | B1 | * | 6/2003 | Kaneko | F16K 17/065 137/109 |
| 6,712,242 | B2 | * | 3/2004 | Friedman | B67D 1/0028 137/109 |
| 7,357,151 | B2 | * | 4/2008 | Lonnes | F16K 3/265 137/509 |
| 7,669,610 | B2 | * | 3/2010 | Larsen | G05D 16/106 137/508 |

\* cited by examiner

VENT VALVE AND METHOD OF USE

FIELD OF THE INVENTION

The present invention relates to an apparatus and method for venting fluid from a fluid system, and in particular for venting fluid from a high pressure fluid system in a controlled manner.

BACKGROUND OF THE INVENTION

In the oil and gas industry, rig up of pressure control equipment requires pressure testing of the equipment to ensure they will hold the well pressure. For example, in wireline logging or workover operations, whenever a wireline lubricator stack is rigged up, it has to be pressure tested before it can be used for deploying a toolstring inside the well. During these operations, especially during workover operations such as bailing, the toolstring may have to be taken apart many times to service the bailer, which requires pressure testing of the lubricator every time.

Fluids and especially compressed gas, such as air, trapped inside pressure control equipment (PCE) can store and release more energy than a liquid held at the same pressure and so may become a safety hazard if not handled properly. For this reason, pressure control equipment should be vented to release all trapped gas and other fluids trapped, prior to testing the PCE at full test pressure. Also, during rig down, pressure control equipment should be vented to release any trapped fluids or gases trapped, prior to disassembly. This measure prevents exposure of operators to hazardous well fluids. For example, after a wireline logging or workover operation, the lubricator stack should also be vented to release any gases or fluids before disconnecting the lubricator.

Releasing fluid or gas from pressure control equipment can typically be a rather cumbersome and risky operation. For example, it is not unusual for a wireline lubricator stack to be in excess of 12 meters high. Venting the trapped gas prior to full pressure testing, should be performed from the highest point of the lubricator stack.

Typically, in order to discharge any fluid and gas from a lubricator stack, an operator may loosen a connection between two lubricator sections or may open an existing valve slightly to allow venting to take place. This operation must be performed as close to the top of the lubricator as possible. Moreover, the safety of the operation is dependent on the knowledge and skill of operators to ensure that venting is not performed when there is an excessively high pressure in the lubricator. If it transpires that the pressure of the trapped fluids or gases is higher than the operator thinks it is, the operator may be exposed to serious risk.

SUMMARY OF THE INVENTION

According to a first aspect of the invention there is provided a vent valve, comprising:
  a valve housing defining a vent port;
  a valve member mounted within the housing so as to define a fluid system chamber and an activation chamber with the housing, wherein;
  the valve member is biased towards a closed position, in which fluid communication between the fluid system chamber and the vent port is prevented, by fluid pressure within the fluid system chamber acting on the valve member; and
  the valve member is biased towards an open position, in which there is fluid communication between the fluid system chamber and the vent port, by fluid pressure within the activation chamber acting on the valve member; and
  the vent valve further comprising a pressure limiting arrangement associated with the activation chamber to limit pressure therein to a predetermined pressure value In use, the vent valve may be connected with a fluid system to establish fluid communication between the fluid system and the fluid system chamber. In such an arrangement, the vent valve may be utilised to permit controlled venting from the fluid system. Further, fluid pressure from the fluid system biases the valve member towards the closed position. Accordingly, when the valve is connected to a fluid system pressure within said system will act to close the valve and prevent venting. Only when fluid pressure in the activation chamber is sufficiently high, will the biasing applied by the fluid pressure within the activation chamber overcome the biasing applied by the fluid system pressure, so that the valve will be permitted to open. Such an arrangement can provide operational safety benefits.

Further, the presence of the pressure limiting arrangement restricts permitted fluid pressure within the activation chamber. This minimises risks associated with venting when very high fluid system pressures are present, since if the pressure in the fluid system chamber increases sufficiently (for example exposed to high pressure of fluid in a well) the force applied to the valve member exceeds the opposing force applied by the pressure of fluid in the activation chamber and the valve automatically closes.

In use, the valve member may move in a first direction, from an open position to a closed position, and may move in a second direction, from a closed position to an open position.

The movement between open and closed positions may be linear.

The valve member may be operable between a range of positions in which the valve is closed, and/or a range of positions in which the valve is open.

The vent valve may comprise a valve seat. The valve seat may be defined by the housing. The valve seat may be formed by a valve seat insert that is positioned inside the housing at the desired location. The valve seat may be formed to cooperatively engage with the valve member.

The valve member may comprise a seat-engaging surface, for example a frustoconical surface, adapted to cooperatively engage with the valve seat in the closed position. When the valve member is in the closed position, the fluid pressure in the fluid system chamber (typically the fluid system pressure) may be applied over the area defined by the valve seat. Thus, a fluid system force, applied by fluid pressure in the fluid system chamber acting on the valve member, may be related to the area defined by the valve seat and to the fluid pressure in the fluid system chamber.

The valve member may be in an open position when the valve seat is disengaged from the seat engaging surface. When the valve is open, a flow path may be defined between the valve member and the valve seat.

The valve seat may form a knife-edge seal with the valve member, for example between a frustoconical surface of the valve member and an end of a cylindrical surface defined by the housing.

The valve seat and the seat engaging surface may be complimentary frustoconical surfaces.

The seal that is formed when the valve member engages the valve seat, may comprise a metal to metal seal or the seal may be formed between plastics or ceramic materials, or a combination of materials. For example the seal may be formed from a combination of a metal to metal and O-ring seal. The metal-to-metal seal may be formed from the same material as the interior wall of the housing or it may be made from a different material. For example one of the materials may be softer than the other, to facilitate sealing.

The valve may comprise a valve member of any suitable configuration, such as a spool, piston, poppet valve member, or the like.

The valve member may define a first side, in fluid communication with the fluid system chamber and/or the vent port, and a second side, in fluid communication with the activation chamber.

The vent valve may comprise a sealing arrangement to isolate fluid on the first side of the valve member from fluid on the second side of the valve member. The sealing arrangement may for example comprise a sliding interference fit between surfaces of the valve member and the housing. The sealing arrangement may comprise a resilient sealing member, such as an O-ring disposed around the valve member.

The seal assembly may be adjacent to the activation chamber.

The fluid pressure in the activation chamber may be applied over the area defined by the sealing arrangement. Thus, an activation force, applied by fluid pressure in the activation chamber acting on the valve member, may be related to the area defined by the sealing arrangement and to the fluid pressure in the activation chamber.

When the valve is open, i.e. when the valve member is in an open position, the fluid pressure in the fluid system chamber (typically the fluid system pressure) may be applied over the area defined by the sealing arrangement. Thus the fluid system force may be related to the area defined by the sealing arrangement and the fluid system pressure.

The areas defined by the valve seat and the sealing arrangement may be selected according to a desired force ratio or bias. However, in some embodiments the areas defined by the valve seat area and the sealing arrangement are substantially equivalent.

The valve may comprise a biasing arrangement to bias the valve member towards a closed position. Accordingly, the valve member will be biased to the closed position unless an activation force is applied to the valve member which is sufficient to overcome a biasing force applied by the biasing arrangement. Furthermore, the amount by which the activation force exceeds the biasing force determines the fluid system force, and thus the fluid pressure in the fluid system chamber, above which the valve will close.

The biasing arrangement may comprise a resilient member or members disposed between the housing and the valve member. The resilient member may for example be a spring, and/or may comprise an elastomer.

The activation chamber may be filled with a pressurised activation fluid (i.e. at a pressure above ambient pressure). The activation chamber may be filled with a pressurised gas, such as compressed air.

The activation chamber may be in fluid communication with an activation port. The activation port may be defined by the housing.

The activation port may be adapted to allow connection thereto of an activation arrangement (e.g. an activation device such as a pump or compressor, or a compressed air supply or a supply of another suitable pressurised fluid) for supplying a fluid, preferably pressurised, to the activation chamber.

The vent valve may comprise an activation device.

In use, the activation port may be open, or may be closed. Thus, the activation chamber may be filled/pressurised and the activation port closed, so as to seal the activation chamber. Alternatively, the activation port may remain open so that the activation chamber is in fluid communication with a source of a pressurised fluid, such as a compressor supplying compressed air.

The pressure limiting arrangement may be in fluid or pressure communication with the activation port and/or the activation chamber. The pressure limiting arrangement may be provided in the housing.

The pressure limiting arrangement may comprise a pressure regulator, a pressure restrictor, a pressure relief valve or some other pressure control device, configured to limit the maximum pressure of fluid in the activation chamber.

For example, a pressure relief valve may be configured to open at the predetermined pressure value, to release fluid from the activation chamber, or from an activation arrangement. The pressure limiting arrangement may comprise a pressure regulator that cuts off, regulates or restricts the supply of fluid to the activation chamber, when the activation pressure exceeds the predetermined pressure value.

The pressure limiting arrangement may comprise a pressure restrictor for limiting the pressure of fluid supplied the activation chamber.

The vent valve may comprise a bore, for example defined within the housing, and the valve member may be slideably movable within the bore.

According to one embodiment, the housing may define a valve bore comprising two cylindrical sub-bores of different cross-section; a larger diameter cross-section sub-bore and a smaller diameter cross-section sub-bore. The valve member may take the form of a double-headed bobbin, comprising two generally cylindrical heads connected by an intermediate conical section, wherein a first head may be sized to movably fit within the larger sub-bore and a second head may be sized to movably fit within the smaller sub-bore. A resilient member such as a coiled spring may be mounted within the larger sub-bore acting upon the first head of the valve member and causing the intermediate conical section to engage a valve seat (thus functioning as a biasing arrangement). The valve seat may be formed or inserted near or at the intersection of the two sub-bores. The sealing arrangement may be operatively disposed at the periphery of the second head of the double headed bobbin, near its end that is proximate the activation port, to provide a seal between the valve member and the housing wall. The activation chamber may be defined between the smaller-sub-bore and the end of the second head.

The first head of the valve member may further comprise a spool bore extending through the valve member from an end of the valve member adjacent to the fluid system chamber. The spool bore may communicate with lateral ports exiting at the side wall of the first head of the double headed bobbin before the intermediate conical section. In a said open position, when the valve member is not engaged with the valve seat, the spool bore may provide a fluid pathway between the fluid system chamber and the vent port.

The vent valve may comprise a fluid system port, in fluid communication through the housing with the fluid system chamber. The fluid system port may be adapted to enable the vent valve to be coupled to a fluid system.

The fluid system port and/or the activation port may comprise any suitable type of connector, such as a threaded connector, or a Standard connector. Other types of connectors may also be used, such as a quick-connect type or connector that is well known in the industry.

The activation force, biasing force and/or the fluid pressure force may vary, in use. For example, the activation/biasing forces may vary as the valve moves between open and closed positions. The activation force may vary for example as the volume of the activation chamber changes, with movement of the valve member. The biasing force may vary for example as the force applied by a resilient member changes throughout the valve member's range of motion.

The housing may comprise two, or more than two, housing parts. The housing parts may be assembled/disassembled to facility assembly or maintenance of the vent valve.

Another aspect of the present invention relates to a fluid system comprising the vent valve according to any other aspect the invention. The fluid system chamber of the vent valve may be in fluid communication with fluid in the fluid system.

The fluid system may comprise pressure control equipment. The fluid system may be in fluid communication with a wellbore.

The pressure control equipment may comprise a wireline lubricator.

The vent valve apparatus may be disposed at or near the top of the fluid system, so as to facilitate venting of a first fluid which is displaced by a second fluid of higher density.

The fluid system may comprise a wellbore, such as a producing well.

The fluid in the fluid system can be in any form such as liquid, gas, liquefied gas and or mixtures thereof.

According to still further aspect of the invention, there is provided a method of using a vent valve in accordance with other aspects of the invention to vent fluid from a fluid system, the method comprising:

placing the vent valve in fluid communication with a fluid system;
and controlling venting of the fluid from the fluid system through the vent valve, by;
biasing the valve member towards a closed position, in which fluid communication between the fluid system chamber and the vent port is prevented, by fluid system pressure acting on the valve member;
biasing the valve member towards an open position, in which there is fluid communication between the fluid system chamber and the vent port, by fluid pressure within the activation chamber acting on the valve member; and
limiting the pressure within the activation chamber to a predetermined pressure value.

DETAILED DESCRIPTION OF THE DRAWINGS

Accordingly, when pressure of fluid in the fluid system is sufficiently low, the pressure of fluid in the activation chamber biases the valve member to an open position. If the pressure of fluid in the fluid system increases and the biasing applied to the valve member by the fluid system pressure exceeds the biasing applied by the fluid in the activation chamber, the valve automatically closes. Furthermore, the maximum biasing applied by fluid in the activation chamber (and so the maximum fluid system pressure above which the valve will close) is limited by the predetermined pressure value.

The method may be used for venting fluids such as gases from a high or low pressure fluid system. The method may be used to vent fluids from pressure control equipment such as may be used in the oil and gas industry during rig up or rig down operations. In a particular embodiment of the present invention, the method may be used to vent fluids from a wireline lubricator stack for example prior to pressure testing the lubricator stack or to vent the lubricator stack prior to removing a toolstring during rig down to prevent exposing site personnel to hazardous well fluids.

The method may comprise selecting or adjusting the predetermined pressure value. For example, an operator may select a predetermined pressure value to in order to ensure a safe operation when venting the fluid from the fluid system.

The method may comprise applying a biasing force, for example under the action of a resilient member on the valve member, to urge the valve member towards the closed position. Thus, in the absence of pressurised fluid in the activation chamber, the biasing force (or, in some embodiments, the biasing force and a fluid system force applied to the valve member by the fluid system pressure) urges the valve member to the closed position.

The vent valve may initially be closed, and the method may comprise opening the valve by filling the activation chamber with a pressurised activation fluid, such as compressed air. The method may comprise closing the valve, by releasing the activation fluid from the activation chamber (for example after sufficient fluid has been vented from the fluid system through the valve).

The method may comprise closing the valve under the action of increased fluid system pressure acting on the valve member. For example, the method may comprise increasing the fluid system pressure (e.g. by opening a control valve upstream of the vent valve) so as to automatically close the vent valve.

The method may comprise venting fluid from pressure control equipment, such as a wireline lubricator.

The method may comprise displacing a first fluid with a second fluid of higher density than the first fluid, and venting the first fluid from the fluid system. The first fluid may for example be a gas (e.g. air, hydrocarbon, or a mixture thereof) and the second fluid may be a liquid, such as production fluid or water.

The method may comprise placing the vent valve (and the fluid system chamber thereof) in fluid communication with an upper part of the fluid system, for example at or near the top of a wireline lubricator stack.

Yet another aspect of the present invention relates to the use of a vent valve according to any other aspects, for venting a fluid from a fluid system.

The invention may comprise using a vent valve to vent fluid from a wellbore, or from pressure control equipment such as a wireline lubricator (which may be in fluid communication with a wellbore). The vent valve may provide for a controlled venting of fluids from these fluid systems.

Further preferred and optional features of each aspect of the invention correspond to preferred and optional features of any other aspect of the invention.

Other applications of the present invention method and apparatus will become apparent to those skilled in this art by the present disclosure without departing from the scope of the invention.

DESCRIPTION OF THE DRAWINGS

The invention will now be described, by way of non-limiting examples only, with reference to the accompanying drawings, in which.

DETAILED DESCRIPTION OF THE DRAWINGS

Figure 1:
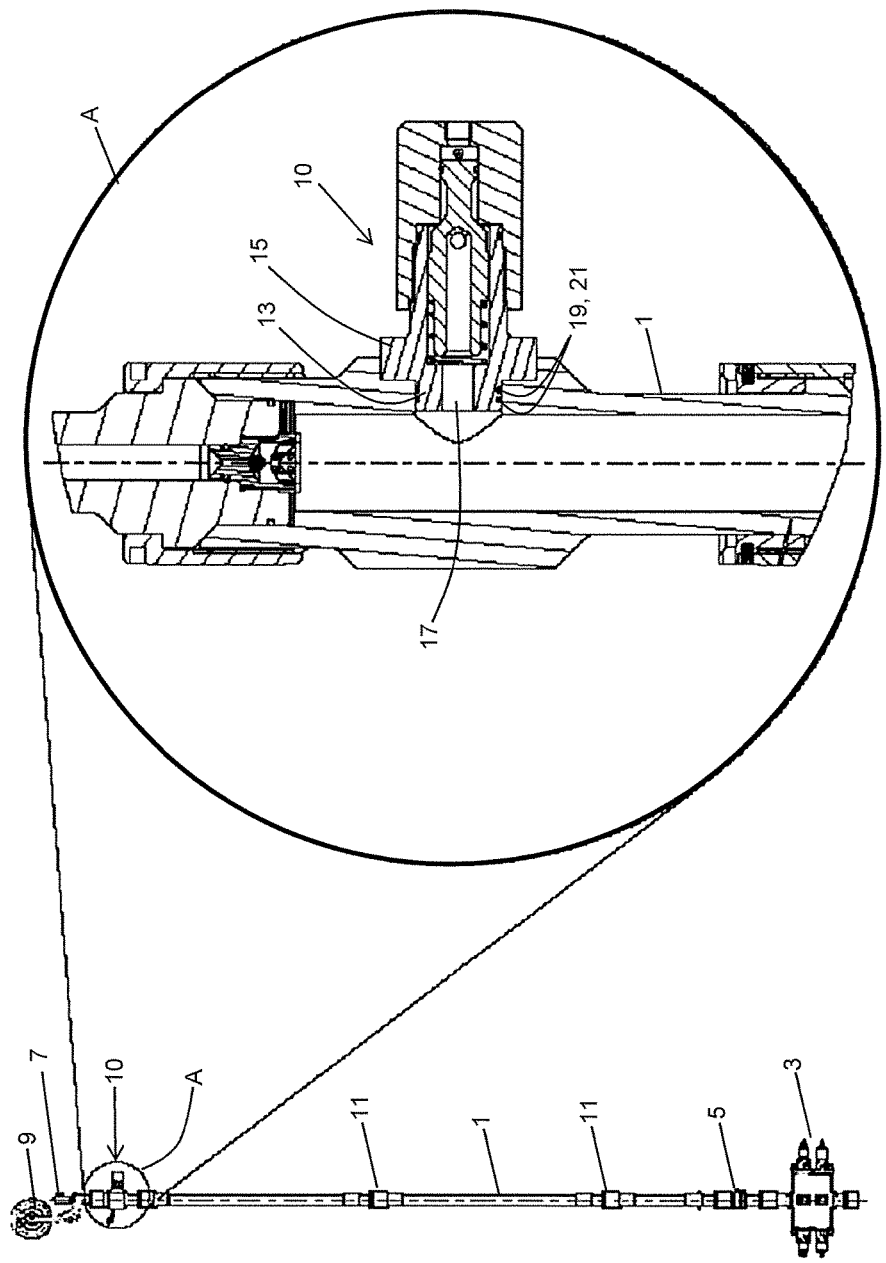
FIG. 1A is an illustration of one embodiment of the vent valve of the present invention shown connected to a wireline lubricator stack.
FIG. 1B is an expanded view of the encircled section of FIG. 1A.

FIG. 1A illustrates a wireline lubricator stack 1, which includes a vent valve 10 according to one embodiment of the present invention. The lubricator stack 1 is connected at one end to a wireline blowout preventer (BOP) 3 via a connector 5 and at its other end to a stuffing box 7.

The lubricator stack 1 is used to introduce wireline tools into an associated wellbore (not shown) with the help of a wireline, which is fed through the stuffing box 7, guided via a wireline sheave 9. The wireline BOP 3 is connected to a well head of a bore (not shown) for controlling the pressure of the wellbore. The lubricator stack 1 comprises a plurality of parts connected together via connectors 11. During rig up, the lubricator stack 1 may be pressure tested before it is exposed to full well pressure via the BOP 3. Prior to the pressure test the lubricator stack 1 should be vented to discharge any trapped fluid especially air to avoid excessive pressurization of the lubricator stack 1 and a faulty pressure test.

FIG. 1B is an enlarged cross sectional view of an upper section A of the lubricator 1, showing the vent valve 10 securely connected, via a connector 13 and a flange 15, to an outlet port 17 on the lubricator.

The connector 13 has grooves 19 for receiving O-rings 21. The grooves and O-rings are more clearly shown in FIGS. 3 and 4.

Figure 2:
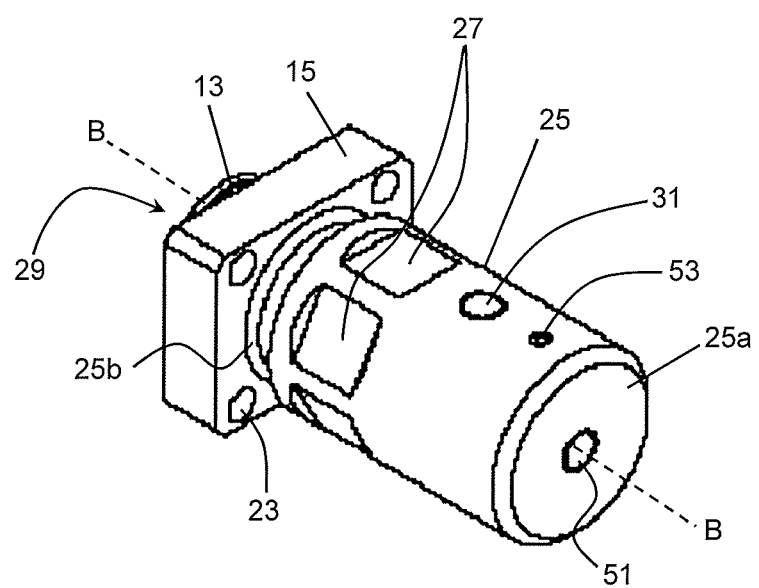
FIG. 2 is a perspective view of one embodiment of the vent valve of the present invention.

The flange 15 has openings 23, visible in FIG. 2, for securing the vent valve 10 with bolts (not shown) to the port 17.

Figure 3:
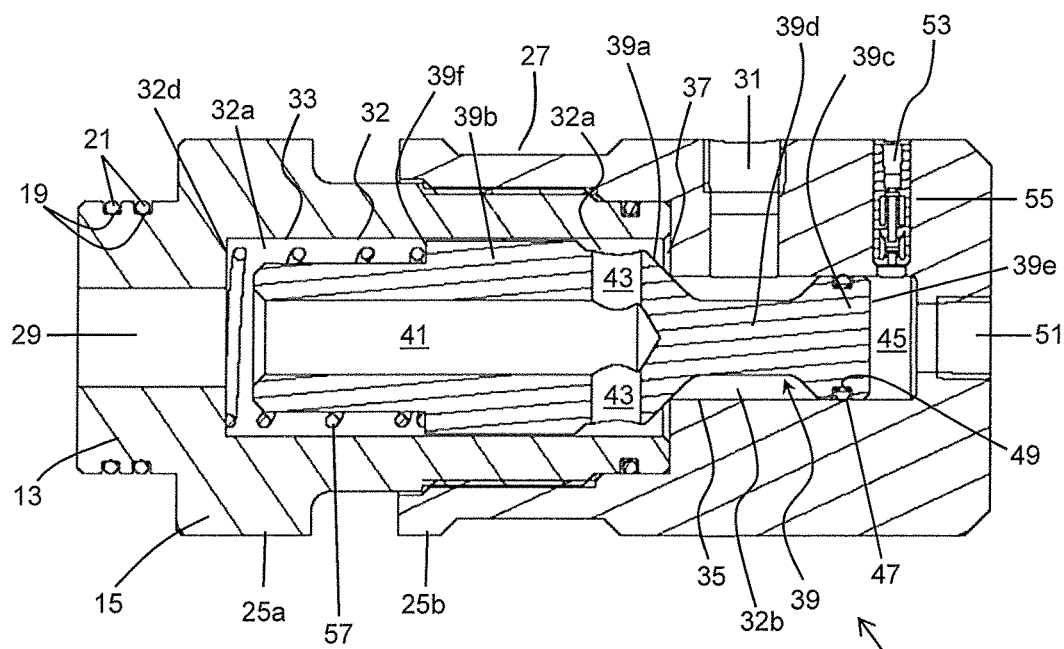
FIG. 3 is a longitudinal cross-sectional view of the vent valve of FIG. 2 taken through line B-B, showing the vent valve in a closed position with the valve spool engaging the valve seat.
Figure 4:
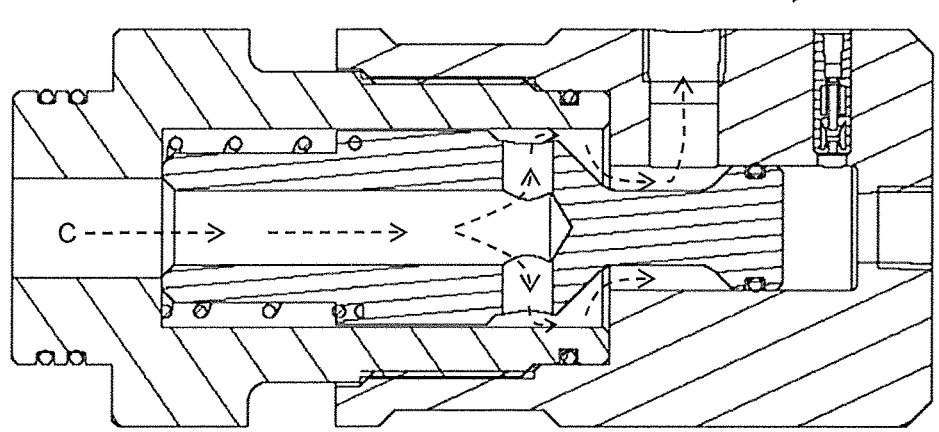
FIG. 4 is a longitudinal cross-sectional view of the vent valve of FIG. 2 taken through line B-B, showing the vent valve in an open position with the spool disengaged from the valve seat.

Referring now to FIGS. 2-4, the vent valve 10 has a housing 25 having two threadably connected parts 25a and 25b. The housing part 25a has landings 27 for allowing a wrench to tighten the threaded connection (not shown) between the housing parts.

A fluid system port 29 and a vent port 31 are defined by the housing. The housing 25 also defines a valve bore 32 extending longitudinally. The bore 32 comprises a larger diameter cross section sub-bore 33 and a smaller diameter cross section sub-bore 35. Between the sub-bores is a knife edge valve seat 37.

As most clearly shown in FIGS. 3 and 4, a valve member 39 (in the form of a spool), positioned in the bore 32. The spool includes a frustoconical intermediate section 39a.

When the valve member is in the closed position shown in FIG. 3, the frustoconical surface of the intermediate section 39a engages with the valve seat 37, preventing fluid communication between the fluid system port 29 and the chamber 32a (the fluid system chamber) to the left of the valve seat (in the orientation shown in the figures), and the vent port 31.

An activation chamber 45 is defined by the end 39e of the spool head 39c and the smaller sub-bore 35. A sealing arrangement is comprised of an O-ring 47, positioned within a groove 49 around the spool head. The O-ring 47 provides a seal between the spool head 39c and the sub-bore 35, to isolate fluid to the left hand side (as viewed in the figures) of the sealing arrangement from the fluid on the right hand side, in the activation chamber 45.

Extending into the activation chamber 45, is an activation port 51 and a pressure limiting arrangement including a pressure relief valve 53 fitted within a port 55 of the housing part 25a.

The pressure relief valve 53 is configured to release fluid from the activation chamber above a predetermined pressure value, and so to limit the maximum pressure of fluid within the activation chamber 45.

The vent valve 10 also includes a biasing arrangement, to bias the valve member 39 towards the closed position shown in FIG. 3, in which the valve seat and the frustoconical surface 39a are engaged. In the embodiment shown, the biasing arrangement includes a coiled spring 57 within the chamber 32a. The spring 57 is held in compression between the annular surface 32d of the bore 32 and annular surface 39f of the spool 39.

The diameter of the spool 39 varies along its length, so that chambers 32a and 32b are defined between the spool and the bore 32. The spool 39 has the shape of a double-headed bobbin, comprising two generally cylindrical spool heads 39b and 39c that are connected by the intermediate conical section 39a and a neck portion 39d. The first spool head 39b is shaped to slidably move within the larger sub-bore 33 and the second spool head 39c is shaped to slidably move within the smaller sub-bore 35.

The intermediate portion 39a and the smaller spool head portion 39c of the spool 39 are joined by a narrower neck portion 39d.

The larger spool head portion 39b further comprises a longitudinal bore 41 fluidly connected to a lateral bore 43 that provide a fluid path between the fluid system port 29 and the vent port 31 (when the valve is open). Although the spool head portion 39b does not form a fluid tight seal against the sub-bore 33, the longitudinal and lateral bores 41, 43 provide a larger flow area.

The spool 39 is moveable away from the closed position of FIG. 3, to an open position such as the fully open position shown in FIG. 4, and vice versa, in a longitudinal direction (in relation to the orientation shown in the figures) within the valve bore 32.

In the open position of FIG. 4, the ports 29 and 31 are in fluid communication, via the flow pathway C (marked with dotted arrows in FIG. 4).

Use of the valve 10 to vent fluid from a fluid system will now be described.

When the vent valve 10 is coupled to the port 15 of the lubricator 11 as shown in FIG. 1A, the fluid system port 29 and the fluid system chamber 32a are placed in fluid communication with the fluid within the lubricator. The chamber 32b and the vent port 31, on the other side of the valve seat 37, are open to the surrounding ambient pressure. Typically also, the activation port 57 is open and the activation chamber 45 is also at ambient pressure.

The biasing force applied by the spring 57 on the spool 39 urges the valve closed. The pressure of fluid in the lubricator is also normally higher than the ambient pressure, and the fluid system pressure (above ambient) of the fluid in the lubricator acting on the spool 39 also biases the spool towards the closed position. When the valve is closed, the fluid system force on the surfaces of the spool 39 in the chamber 32a is proportional to the area defined by the valve seat 37 and to the fluid system pressure.

The valve may be opened (i.e. the spool 39 moved away from the valve seat to an open position) by connecting the activation port 51 to a compressed air supply (not shown) so as to pressurise the activation chamber 45. The compressed air in the activation chamber acting on the surface 39e, biases the valve member towards the fully open position of FIG. 4. The activation force applied by the pressure of fluid in the activation chamber is proportional to the surface area defined by the sealing arrangement (i.e. the seal between the O-ring 47 and the sub-bore 35) and to the pressure in the activation chamber.

When the pressure in the activation chamber is sufficient for this activation force to overcome the fluid pressure and biasing forces, the valve opens and fluid can vent from the lubricator 11 along the path C, as described above.

When the valve is open, the fluid system force to the surfaces of the spool 39 in the chambers 32a and 32b is proportional to the area defined by the sealing arrangement and the fluid system pressure in the lubricator.

In the event that the fluid system pressure in the lubricator, entering the vent valve 10 through the fluid system port 29, becomes excessive, the fluid pressure force increases and overcomes the activation force and closes the valve. When or if the pressure in the activation chamber 45 reaches or exceeds a predetermined pressure value (for example if the valve is forced closed suddenly), compressed air is vented from the activation chamber through the pressure relief valve 53.

In the embodiment shown, the surface areas defined by the valve seat and the sealing arrangement are the same, i.e. equal to the diameter of the sub-bore 35. Thus, the fluid system force remains substantially constant (for a constant fluid pressure) when the valve is open and when it is closed. Moreover, since the biasing force applied by the spring 57 is typically much lower than the forces applied by fluid in the activation and fluid system chambers at normal operating pressures, the pressure in the activation chamber is approximately equivalent to the fluid system pressure at which the valve will automatically close.

It should be understood that the embodiments described herein are merely exemplary and that various modifications may be made thereto without departing from the scope of the invention as claimed.

The invention claimed is:

1. A lubricator stack vent valve for controlling venting of a fluid from a lubricator stack, the lubricator stack vent valve comprising:
    a valve housing comprising a lubricator stack chamber and a first bore which opens into the lubricator stack chamber, wherein the valve housing is configured to be secured to the lubricator stack to present the lubricator stack chamber in communication with the lubricator stack, the valve housing defining a vent port in communication with the first bore;
    a valve seat defined at an interface between the first bore and the lubricator stack chamber such that a cross-sectional area of the valve seat is equivalent to a cross-sectional area of the first bore; and
    a valve member mounted within the housing and comprising a seat-engaging surface for engaging the valve seat, and a spool head located within the first bore of the housing such that the vent port is located between the spool head and the valve seat, the spool head being sealed relative to an inner surface of the first bore to define an activation chamber at least partially within the first bore, wherein the spool head defines a terminating axial end face of the valve member which defines a moveable wall of the activation chamber, the lubricator stack chamber and the activation chamber being in pressure communication with each other via the valve member, wherein:
    the valve member is moveable between a closed position in which the seat-engaging surface is engaged with the valve seat to prevent fluid communication between the lubricator stack chamber and the vent port, and an open position in which the seat-engaging surface is disengaged from the valve seat to provide fluid communication between the lubricator stack chamber and the vent port;
    the valve member is biased towards the open position by fluid pressure within the activation chamber acting on the terminating end face of the valve member;
    the valve member is biased towards the closed position by fluid pressure within the lubricator stack chamber acting on the valve member, movement of the valve member towards the closed position being resisted by fluid pressure within the activation chamber; and
    the vent valve further comprising a pressure relief arrangement mounted on the valve housing for relieving pressure from the activation chamber when pressure therein reaches a predetermined upper limit pressure value, such that the pressure relief arrangement defines a maximum permitted pressure within the activation chamber which resists movement of the valve member towards its closed position.

2. The lubricator stack vent valve according to claim 1, wherein, when the valve member is in the closed position, a force applied by fluid pressure in the lubricator stack chamber acting on the valve member is related to the cross-sectional area of the valve seat and to the fluid pressure in the lubricator stack chamber.

3. The lubricator stack vent valve according to claim 1, wherein the valve seat forms a knife-edge seal with the valve member; when the valve member is in the closed position.

4. The lubricator stack vent valve according to claim 1, comprising a seal disposed around the spool head of the valve member to provide sealing between the spool head and the inner surface of the first bore.

5. The lubricator stack vent valve according to claim 1, wherein force applied by fluid pressure in the activation chamber acting on the terminating end face of the valve member is related to the cross-sectional area of the first bore and to the fluid pressure in the activation chamber.

6. The lubricator stack vent valve according to claim 1, comprising a biasing arrangement to bias the valve member towards a closed position.

7. The lubricator stack vent valve according to claim 6, wherein the biasing arrangement comprises at least one resilient member disposed between the housing and the valve member.

8. The lubricator stack vent valve according to claim 1, wherein the activation chamber is in fluid communication with an activation port, adapted to allow connection thereto of an activation arrangement supplying pressure to the activation chamber.

9. The lubricator stack vent valve according to claim 1, wherein the pressure relief arrangement comprises at least one of a pressure regulator, a pressure restrictor, a pressure relief valve, and a pressure restrictor for limiting the pressure of fluid in the activation chamber.

10. The lubricator stack vent valve according to claim 1, comprising a lubricator stack port, in fluid communication through the housing with the lubricator stack chamber and adapted to enable the vent valve to be coupled to a fluid system.

11. A lubricator stack comprising a lubricator stack vent valve according to claim 1, wherein the lubricator stack chamber of the lubricator stack vent valve is in fluid communication with fluid in the lubricator stack.

12. The lubricator stack according to claim 11, wherein the lubricator stack vent valve is disposed at or near the top of the lubricator stack, so as to facilitate venting of a first fluid which is displaced by a second fluid of higher density.

13. A method of venting a fluid from a lubricator stack using a lubricator stack vent valve according to claim 1, the method comprising:
    placing the lubricator stack vent valve in fluid communication with the lubricator stack; and
    controlling venting of the fluid from the fluid system through the lubricator stack vent valve, by:
        biasing the valve member towards a closed position, in which fluid communication between the lubricator stack chamber and the vent port is prevented, by lubricator stack pressure acting on the valve member;
        biasing the valve member towards an open position, in which there is fluid communication between the lubricator stack chamber and the vent port, by fluid pressure within the activation chamber acting on the valve member; and
        limiting the pressure within the activation chamber to a maximum permitted pressure such that fluid communication between the lubricator stack chamber and the vent port is only achievable when the pressure within the activation chamber is at or below the maximum permitted pressure.

14. The method according to claim 13, comprising applying a biasing force to urge the valve member towards the closed position.

15. The method according to claim 13, comprising opening the valve by filling the activation chamber with a pressurised activation fluid.

16. The method according to claim 13, comprising closing the valve, by releasing the activation fluid from the activation chamber, or by closing the valve under the action of increased lubricator stack pressure acting on the valve member.

17. The method according to claim 13, comprising increasing the lubricator stack pressure so as to automatically close the vent valve.

18. Use of a vent valve according to claim 1, for venting a fluid from a fluid system.

19. The lubricator stack vent valve according to claim 1, wherein the pressure relief arrangement is mounted in a wall of the housing and in communication with the activation chamber.

20. The lubricator stack vent valve according to claim 1, wherein the valve housing comprises a threaded portion at one end thereof for permitting the lubricator stack vent valve to be secured to a lubricator stack.

21. The lubricator stack vent valve according to claim 1, wherein the valve housing comprises first and second housing portions secured together.

22. The lubricator stack vent valve according to claim 21, wherein the first housing portion defines the lubricator stack chamber and the second housing portion defines the first bore.

* * * * *